(12) United States Patent
Archer et al.

(10) Patent No.: US 7,315,322 B2
(45) Date of Patent: Jan. 1, 2008

(54) METHOD OF TESTING THE UNIFORMITY OF AN IMAGE SENSOR

(75) Inventors: Greg L. Archer, Rochester, NY (US); Eric J. Meisenzahl, Ontario, NY (US); Dennis J. Vankerkhove, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 695 days.

(21) Appl. No.: 10/900,723

(22) Filed: Jul. 28, 2004

(65) Prior Publication Data

US 2006/0023068 A1 Feb. 2, 2006

(51) Int. Cl.
H04N 17/00 (2006.01)
H04N 17/02 (2006.01)

(52) U.S. Cl. .................... 348/187; 205/208.1
(58) Field of Classification Search ............ 348/187, 348/188, 175, 176, 180, 207.99; 250/208.1
See application file for complete search history.

(56) References Cited

U.S. PATENT DOCUMENTS

| | | | |
|---|---|---|---|
| 4,523,231 A * | 6/1985 | Therrien | 348/187 |
| 5,467,128 A * | 11/1995 | Yates et al. | 348/187 |
| 5,694,227 A * | 12/1997 | Starkweather | 358/504 |
| 6,392,216 B1 * | 5/2002 | Peng-Tan | 250/208.1 |
| 7,012,634 B2 * | 3/2006 | Vogel et al. | 348/187 |

* cited by examiner

*Primary Examiner*—M. Lee
(74) *Attorney, Agent, or Firm*—Peyton C. Watkins

(57) ABSTRACT

A method for testing an image sensor for photoresponse uniformity, the method includes the steps of providing a light source having inherent non-uniform light intensity characteristics; providing a light sensing device for measuring an intensity response of the light source on a predetermined image plane; determining an area on the image plane corresponding to an area for the image sensor; measuring pre-selected points of the determined area by the light sensing device for measuring incident light intensity from the light source on the image plane; interpolating non-measured points on the image plane representing an estimate of the non-uniformity of the light source at the non-measured points; inverting the interpolated image to represent the inverse of the light source non-uniformity; and applying the inverted image to the response of the image sensor which compensates for light source non-uniformity and enables the ability to quantify accurately the non-uniformity of the image sensor.

3 Claims, 3 Drawing Sheets

METHOD OF TESTING THE UNIFORMITY OF AN IMAGE SENSOR

FIELD OF THE INVENTION

The invention relates generally to the field of image sensors and, more particularly, to testing such image sensors for uniformity of response.

BACKGROUND OF THE INVENTION

Light sources are used to test the performance of charge couple devices (CCDs). Common sources used today include combinations of red, green, and blue LEDs. Individual control of each color LED is required to achieve the desired spectral illuminance during testing. The LEDs are distributed in a printed circuit board such that spectral non-uniformity is minimized. Any optical component, especially lenses, in the light path of the LEDs will also cause the intensity of light to become non-uniform making it difficult to measure intrinsic CCD uniformity accurately.

Consequently, a need exits for a method of testing image sensors such as CCDs that compensates for non-uniformity of optical components.

SUMMARY OF THE INVENTION

The present invention is directed to overcoming one or more of the problems set forth above. Briefly summarized, according to one aspect of the present invention, the invention resides in a method for testing an image sensor for photoresponse uniformity, the method comprising the steps of (a) providing a light source having inherent non-uniform light intensity characteristics; (b) providing a light sensing device for measuring an intensity response of the light source on a predetermined image plane; (c) determining an area on the image plane corresponding to an area for the image sensor; (d) measuring pre-selected points of the determined area by the light sensing device for measuring incident light intensity from the light source on the image plane; (e) interpolating non-measured points on the image plane representing an estimate of the non-uniformity of the light source at the non-measured points; (f) inverting the interpolated image to represent the inverse of the light source non-uniformity; and (g) applying the inverted image to the response of the image sensor which compensates for light source non-uniformity and enables the ability to quantify accurately the non-uniformity of the image sensor.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention includes the following advantage of compensating for light source non-uniformity that enables the ability to quantify accurately the non-uniformity of the image sensor.

DETAILED DESCRIPTION OF THE INVENTION

Figure 1:
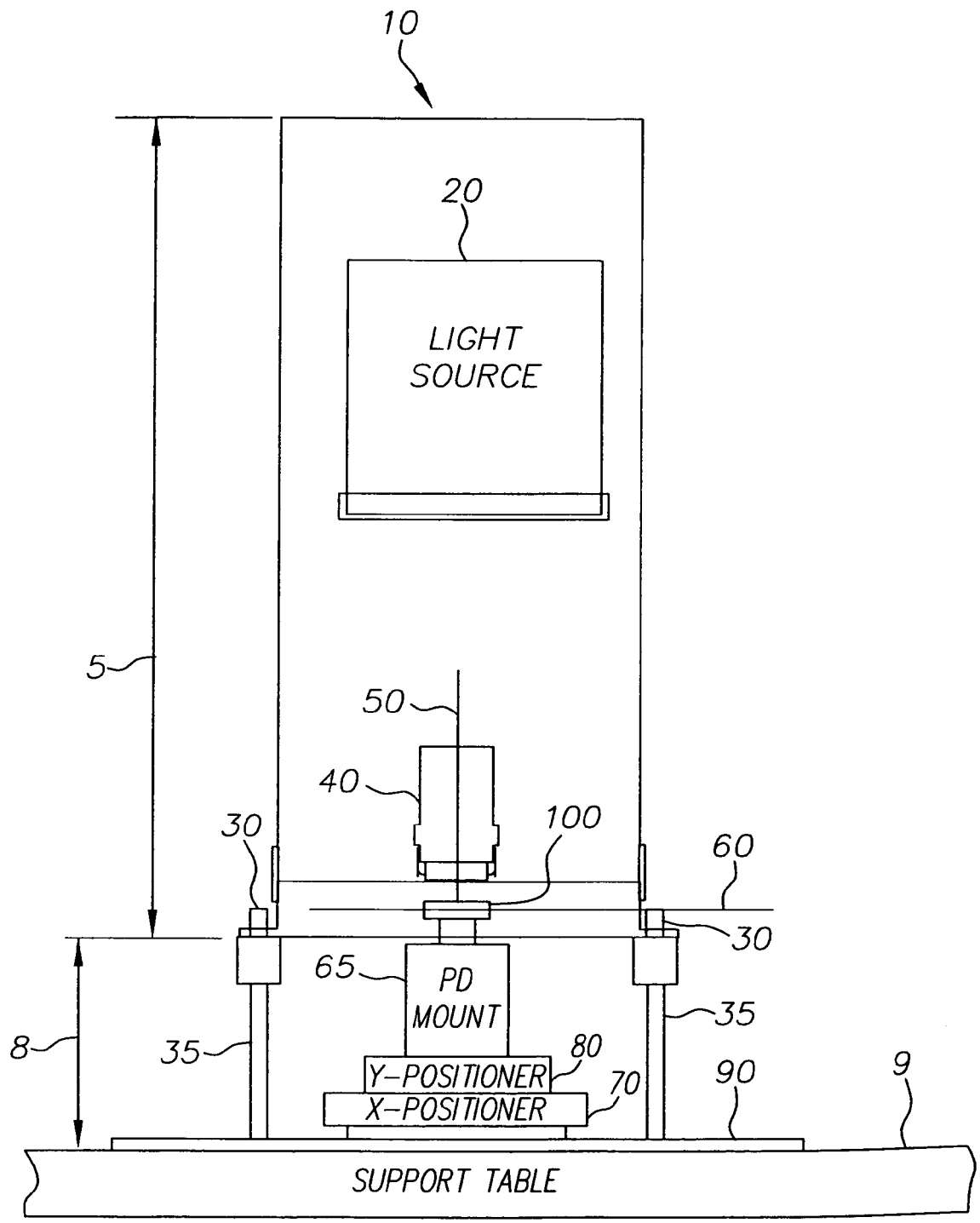
FIG. 1 is a side view in cross section of the light assembly and x-y positioner of the present invention.

Referring to FIG. 1, there is shown the light source assembly 5 and x-y positioner 8 of the present invention for quantifying non-uniformity of image sensors. The x-y positioner 8 preferably rests on a supporting surface, such as a table 9, and the assembly 5 when attached is aligned and rests on the x-y positioner 8. The light assembly 5 includes a light tight enclosure 10 for enclosing a light source 20 contained therein. The assembly includes reference holes to which mounting pins 30 are placed for positioning a later mounted image sensor at a precise location relative to the pins 30. A support bracket 35 holds the pins 30 and supports the light tight enclosure 10. An optical component, such as a lens 40, is placed in the optical path 50 of the light source for focusing the light onto the image plane 60. It is instructive to note that an image sensor device includes a package for holding the image sensor, and a glass covering for forming a seal for the package. The image plane 60 is defined as the plane through the top surface of the image sensor. It is to be noted that the image sensor is removed for permitting such a light sensing element, such as a photodiode, that senses light in the predefined plane. As used herein, the non-uniformity that will be compensated for can be a result of the light source 20 and/or any components in the optical path 50, such the lens 40.

A photodetector (PD) mounting stage 65, through which the image plane 60 passes, is attached to the two motors 70 and 80 for moving the mounting stage 65 in both the x-y positions. One motor 70 moves the stage 65 in the x direction, and the other motor 80 moves the stage in the y direction. As may be readily apparent, this movement will cause precise movements on the image plane 60. A base plate 90 is attached to the motor 70 and support brackets 35 for supporting the light tight enclosure 10.

A photodetector 100 is disposed in the stage 65 for measuring the light intensity of the light source 20 at the image plane 60. The photodetector 100 converts incident light into electrons for permitting measurement of current. The photodetector 100 is attached to an amplifier (not shown) that accurately measures current. Such amplifiers are well known in the art and will not be discussed in detail herein.

Figure 2:
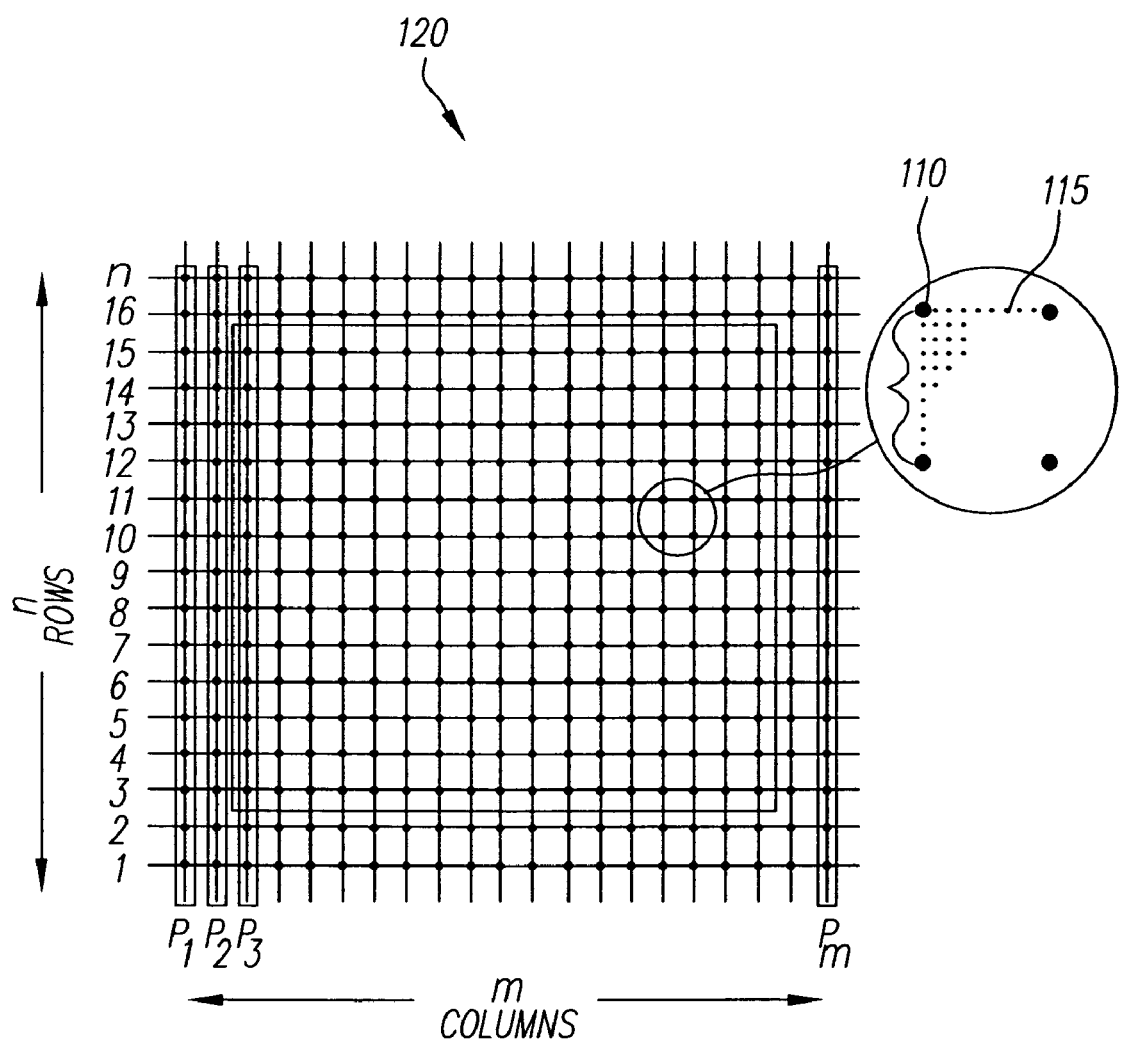
FIG. 2 is an illustration of a typical grid from calculated measurements.

The motors 70 and 80 are energized for moving the photodetector 100 on the image plane 60 at predefined points where light intensity is measured and recorded. The measurements are recorded by the amplifier. Referring to FIG. 2, a plurality of points 110 are measured and a computer takes the measurements and interpolates (calculates) a plurality points 115 between the measured points 110. Such interpolation generates a correction image which when applied to actual images removes optical artifacts. To obtain the interpolated values, and using the actual values obtained, a surface interpolation function is needed to evaluate the function F(x,y) for the untabulated values of x and y in order to generate an image which represents the non-uniformity of the light source 20 and/or any components in the optical path 50. The interpolation is broken into a series of one-dimensional interpolations in which the measured data values 110 are theoretically arranged in a m x n matrix 120. Initially, the coefficients for each of the polynomials representing the m columns are determined using each of the columns n data points from each row. The calculations loop through each row, with each row number input into each of the m polynomials previously calculated, which results in m new values at each row. The m data values are then used to calculate a polynomial for that row, for which the columns are sequentially input to determine each row, column value. Each row, column value is divided by the calculated average of all interpolated values in order to generate a normalized inverse image.

Figure 3:
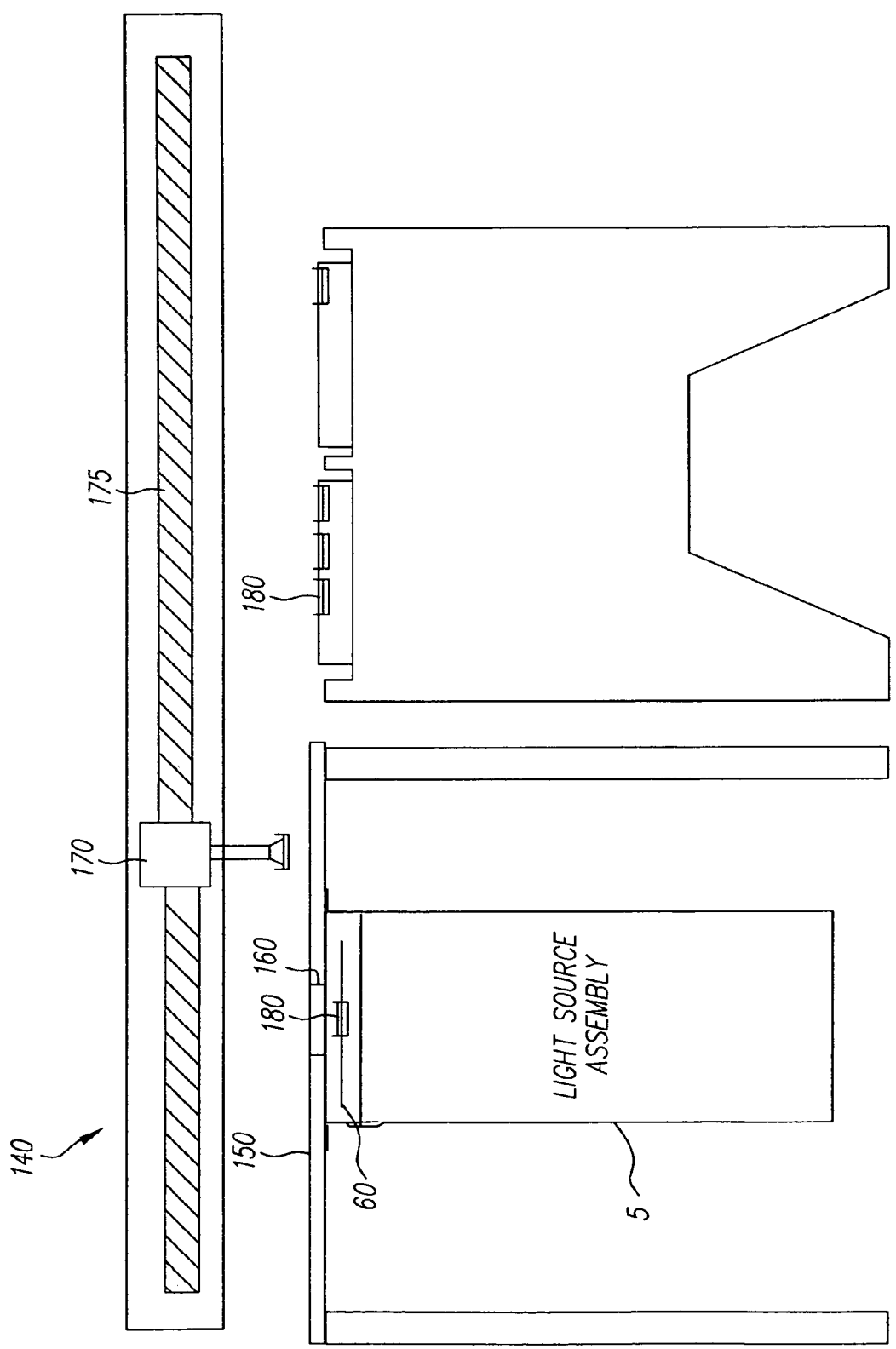
FIG. 3 is a side view in cross section of the test assembly of the present invention

Now referring to FIG. 3, after interpolation, the values are inverted to produce a correcting image as those skilled in the art will readily recognize how to achieve. Thereafter, the assembly 5 is detached from the x-y positioner 8, and the assembly 5 is attached to a production test fixture 140. The test fixture 140 includes a metal plate 150 with a hole 160. The pick head 170 moves along a track 175 and picks up an image sensor 180 from a tray of untested image sensors and places the image sensor 180 through the hole 160 to the location of the image plane 60. It is instructive to note that the image sensors 180 are shown at all locations in which they are located during the testing process. The image sensor 180 is tested with the light source 5 and its response is compensated with the correction image. Applying the inverted image to the response of the image sensor compensates for light source non-uniformity and enables the ability to quantify accurately the non-uniformity of the image sensor. This removes any or all artifacts of the optical components of the light assembly.

The invention has been described with reference to a preferred embodiment. However, it will be appreciated that variations and modifications can be effected by a person of ordinary skill in the art without departing from the scope of the invention.

PARTS LIST 5 light source assembly
8 photodetector x-y positioner
9 support table
10 light tight enclosure/housing
20 light source
30 mounting pins
35 support brackets
40 lens
50 optical path
60 image plane
65 photodetector mounting stage
70 x positioner motor
80 y positioner motor
90 base plate
100 photodetector
110 plurality of point/measured values
115 interpolated values/plurality points
120 grid/matrix
140 production test fixture
150 metal plate
160 hole in metal plate
170 pick head
175 track
180 image sensors

The invention claimed is:

1. A method for testing an image sensor for photoresponse uniformity, the method comprising the steps of:
    (a) providing a light source having inherent non-uniform light intensity characteristics;
    (b) providing a light sensing device for measuring an intensity response of the light source on a predetermined image plane;
    (c) determining an area on the image plane corresponding to an area for the image sensor;
    (d) measuring pre-selected points of the determined area by the light sensing device for measuring incident light intensity from the light source on the image plane;
    (e) interpolating non-measured points on the image plane representing an estimate of the non-uniformity of the light source at the non-measured points;
    (f) inverting the interpolated image to represent the inverse of the light source non-uniformity; and
    (g) applying the inverted image to the response of the image sensor which compensates for light source non-uniformity and enables the ability to quantify accurately the non-uniformity of the image sensor.

2. The method as in claim 1 further comprising the step of providing an optical component in the light path between the light source and the image plane which effects the optical component is subsequently compensated.

3. The method as in claim 1, wherein step (a) includes providing a photodetector as the light sensing device.

* * * * *